(12) United States Patent
Hideur et al.

(10) Patent No.: US 9,590,381 B2
(45) Date of Patent: Mar. 7, 2017

(54) FIBER-OPTIC LASER OSCILLATOR

(75) Inventors: Ammar Hideur, Le Petit Quevilly (FR); Caroline Lecaplain, Rouen (FR); Sébastien Fevrier, Limoges (FR); Philippe Roy, Limoges (FR)

(73) Assignees: Centre National de la Recherche Scientifique, Paris (FR); Universite de Rouen, Mont-Saint-Aignan (FR); Universite de Limoges, Limoges (FR)

( * ) Notice: Subject to any disclaimer, the term of this patent is extended or adjusted under 35 U.S.C. 154(b) by 513 days.

(21) Appl. No.: 14/009,661

(22) PCT Filed: Apr. 4, 2012

(86) PCT No.: PCT/IB2012/051657
§ 371 (c)(1),
(2), (4) Date: Nov. 13, 2013

(87) PCT Pub. No.: WO2012/137145
PCT Pub. Date: Oct. 11, 2012

(65) Prior Publication Data
US 2016/0028205 A1    Jan. 28, 2016

(30) Foreign Application Priority Data
Apr. 5, 2011   (FR) ...................................... 11 52937

(51) Int. Cl.
*H01S 3/30* (2006.01)
*H01S 3/067* (2006.01)
(Continued)

(52) U.S. Cl.
CPC ...... *H01S 3/06729* (2013.01); *H01S 3/06754* (2013.01); *H01S 3/06791* (2013.01);
(Continued)

(58) Field of Classification Search
CPC ............ H01S 3/06729; H01S 3/06791; H01S 3/06754; H01S 3/094015; H01S 3/1115; H01S 3/08045
See application file for complete search history.

(56) References Cited

U.S. PATENT DOCUMENTS

| 4,770,492 A * | 9/1988 | Levin ................. G02B 6/03611 250/227.14 |
| 2002/0126971 A1* | 9/2002 | Soufiane ................. G02B 6/02 385/123 |

(Continued)

FOREIGN PATENT DOCUMENTS

| WO | 01/50639 | 7/2001 | |
| WO | 2008/105833 | 9/2008 | |
| WO | WO2010056920 A1 * | 5/2010 | ............. H01S 3/067 |

OTHER PUBLICATIONS

Fang et al., High Pulse Energy Mode-Locked Multicore Photonic Crystal Fiber Laser, Optics Letters, 36, pp. 1005-1007, 2011.

(Continued)

*Primary Examiner* — Yuanda Zhang
(74) *Attorney, Agent, or Firm* — Morgan, Lewis & Bockius LLP

(57) ABSTRACT

The invention relates to a laser oscillator comprising an amplifying optical fiber (MA) inserted in a resonant cavity so as to act as an active medium, and pumping means (DL, CP) causing a population inversion in said amplifying optical fiber, characterized in that said amplifying optical fiber comprises at least two cores (C1, C2) optically coupled to each other in a common cladding (G), and in that the shapes, sizes, refractive indices and the relative arrangement of said cores are chosen so that super-modes are supported, at least one (SMI) of which super-modes has, in an emission spectral band of said laser oscillator, a normal chromatic dispersion.

17 Claims, 4 Drawing Sheets

Figure 1:
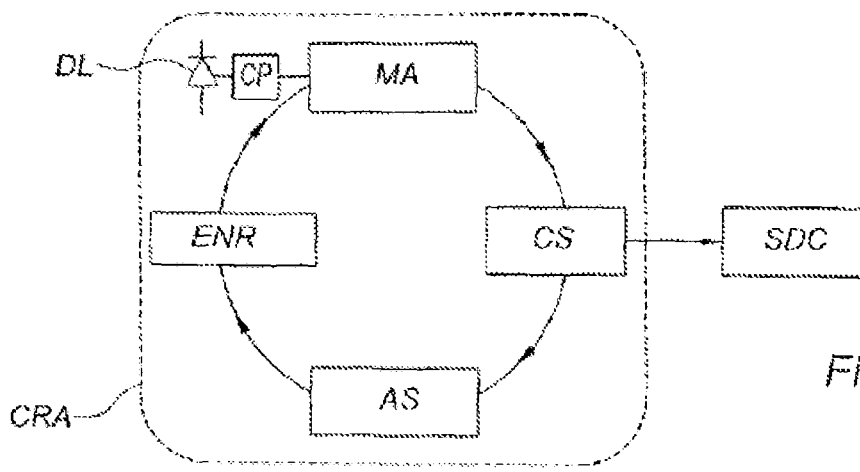

(51) Int. Cl.
*H01S 3/08* (2006.01)
*H01S 3/11* (2006.01)
*H01S 3/094* (2006.01)
*H01S 3/0941* (2006.01)

(52) U.S. Cl.
CPC .... H01S 3/08045 (2013.01); H01S 3/094015 (2013.01); H01S 3/1115 (2013.01); *H01S 3/06725* (2013.01); *H01S 3/06737* (2013.01); *H01S 3/09415* (2013.01)

(56) References Cited

U.S. PATENT DOCUMENTS

| | | | | |
|---|---|---|---|---|
| 2003/0026565 | A1* | 2/2003 | Anderson | C03B 37/01807 385/123 |
| 2004/0156608 | A1* | 8/2004 | Po | G02B 6/03611 385/127 |
| 2005/0238070 | A1* | 10/2005 | Imeshev | G02F 1/3558 372/21 |
| 2005/0254762 | A1* | 11/2005 | Provost | G02B 6/02261 385/123 |
| 2006/0056480 | A1* | 3/2006 | Mielke | H01S 3/06791 372/94 |
| 2006/0291521 | A1* | 12/2006 | Ilday | H01S 3/06708 372/94 |
| 2009/0154503 | A1* | 6/2009 | Peyghambarian | H01S 3/067 372/6 |
| 2009/0168149 | A1* | 7/2009 | Petersson | G02B 6/02323 359/339 |

OTHER PUBLICATIONS

Auguste et al., 1800 ps/(nm.km) Chromatic Dispersion at 1.55 [micro]m in Dual Concentric Core Fiber, Electronics Letters, 36, pp. 1689-1691, 2000.

* cited by examiner

FIBER-OPTIC LASER OSCILLATOR

The invention relates to a fiber-optic laser oscillator. More specifically, the invention relates to a laser oscillator that can operate in mode-locking regime to generate ultra-brief, high energy pulses.

"Ultra-brief pulses", or "ultra-rapid pulses" should be understood to mean pulses measured in "picoseconds" or "femtoseconds".

Picosecond (femtosecond) pulses should be understood to be pulses exhibiting a duration at mid-height less than or equal to 500 ps (500 fs, respectively), this duration being able to be measured directly at the output of the oscillator or after an operation to compensate the frequency drift (chirp) by dispersive means.

"High-energy pulses" should be understood to be pulses that exhibit, at the output of the oscillator and before any out-of-cavity amplification, an energy greater than or equal to 100 nJ, even 1 µJ.

Ultra-rapid high-energy laser pulses are used in numerous scientific, industrial or medical applications. Non-limiting examples include nonlinear microscopy, the generation of high-order harmonics, time-resolved imaging, precision micro-machining and ophthalmic surgery.

Currently, the best performance levels are obtained using massive femtosecond lasers based on Ti:sapphire, which make it possible to achieve pulse durations as low as 5 fs. However, these lasers suffer from numerous drawbacks which render them ill-suited to industrial applications: in practice, they are relatively bulky, costly, energy consuming and exhibit long-term stability problems. They have to be optically pumped by a green light, generally emitted by argon ion or solid state lasers with frequency conversion, which are in turn costly. Moreover, thermo-optical effects limit their power and their frequency. Furthermore, the energy at the output of the oscillator does not generally exceed a few tens, or even a few hundreds, of nanojoules; thus, an out-of-cavity amplification is necessary for numerous applications, which subsequently increases the cost and the bulk of the system.

The "thin disc" lasers, recently introduced (see document EP1236249), constitute an interesting alternative, at least for the applications that do not require extremely brief pulses. These lasers have made it possible to generate pulses of a duration less than 800 fs and of energy greater than 2 µJ at the output of the oscillator, at a frequency of 60 MHz. They offer the considerable advantage of being able to be pumped by semiconductor lasers (laser diodes). However, the use of an active medium in thin disc form complicates the geometry of the cavity and the pumping.

The fiber lasers, of which the optical gain medium consists of a doped optical fiber, usually doped with rare earth ions, are economical, compact, robust and stable; they can be pumped easily by laser diodes; their high surface-volume ratio simplifies the heat management; they exhibit a high gain which allows for operation at high frequency with significant average power; furthermore, they emit pulses that exhibit a high spatial quality. The energy of the pulses at the output of the oscillator is nevertheless limited by the strong effective non-linearities which characterize the optical fibers. The generation of high-energy pulses therefore necessitates, generally, an out-of-cavity amplification, which results in systems that are too complex for industrial applications.

During its propagation in an optical fiber, a pulse is subject—if its amplification or attenuation is initially disregarded—to the dispersion of its group speed ($2^{nd}$ order dispersion effect) and to the optical Kerr effect ($3^{rd}$ order non-linearity). The trend, as a function of distance travelled z and of time t, of the complex amplitude A of its envelope is then described by the following equation, known as the "non-linear Schrödinger equation":

$$i\frac{\partial A}{\partial z} = \frac{\beta_2 \partial^2 A}{2\partial t^2} - \gamma |A|^2 A$$

in which:

$\beta_2$ is the group speed dispersion coefficient; it is given by $$\beta 2 = \frac{d^2\beta}{d\omega^2},$$

$\omega$ being the angular frequency and $\beta$ the light propagation constant. The chromatic dispersion parameter $D_c = -2\pi c \beta_2 / \lambda^2$ is more commonly used, in which c is the velocity of light in a vacuum and $\lambda$ is the wavelength linked to $\omega$ by $\omega = 2\pi c/\lambda$. The parameter $D_c$ is generally expressed in ps/(nm·km). When $\beta_2 < 0$ ($D_c > 0$), negative or abnormal dispersion applies; when $\beta_2 > 0$ ($D_c < 0$), positive or normal dispersion applies.

$\gamma$ represents the effective non-linearity of the fiber, given by $$\gamma = \frac{n_2 \omega_0}{c A_{\text{eff}}}$$

in which: $n_2$ is the non-linear refractive index, $\omega_0$ the angular frequency of the carrier of the pulse, c the speed of light and $A_{\text{eff}}$ the effective surface of the mode of the optical fiber (effective modal surface) at the angular frequency coo defined by:

$$A_{\text{eff}} = \frac{\left[\iint_{-\infty}^{+\infty} E(x,y)^2 \, dS\right]^2}{\iint_{-\infty}^{+\infty} E(x,y)^4 \, dS}$$

in which E(x,y) represents the electrical field distribution of the mode considered over the cross section of the optical fiber.

When the dispersion is abnormal, there are pulse profiles for which the non-linear and dispersive effects cancel out exactly: solitons. Unfortunately, the solitons are stable only for energies below the limit value $$Es \frac{1}{T_s} \frac{2|\beta_2|}{\gamma},$$

$T_s$ being the duration of the pulse (soliton area theorem). Physically, the soliton laser oscillators that use conventional optical fibers made of silica can generate only pulses that have an energy less than approximately 0.1 nJ. A "conventional fiber" should be understood to be a unimodal optical fiber with no particular management of the chromatic dispersion or of the effective modal surface.

The fiber lasers with dispersion management make it possible to exceed the limit imposed by the soliton area theorem. The cavity of these lasers comprises an amplifying optical fiber with abnormal dispersion, as in a soliton oscillator, but also a section exhibiting a normal dispersion which stretches the pulses in order to limit induced non-linearities. For example, the document U.S. Pat. No. 5,450,427 and the article [Lenz 1995] describe an oscillator with dispersion management in which the normal (negative) dispersion is introduced by a non-uniform Bragg grating. In this way, energies of a few nano joules can be achieved at the output of the oscillator, which remains inadequate for numerous applications.

The document U.S. Pat. No. 5,513,194 describes a laser oscillator with dispersion management entirely integrated in optical fiber. In this oscillator, the amplifying fiber exhibits a normal dispersion, which is compensated by a passive fiber with abnormal dispersion. The amplifying fiber is made of erbium-doped silica; it therefore exhibits an optical gain at a wavelength (1.55 μm) at which the silica exhibits an abnormal dispersion. In these conditions, to be able to exhibit a normal dispersion, the fiber has to be of the type with offset dispersion, and thereby have a very small modal surface, which limits the maximum energy of the pulses.

In order to avoid the constraints associated with the use of amplifying fibers with abnormal dispersion, it has been proposed to produce lasers that exploit the concept of "similariton". The "similaritons" are pulses with a parabolic time profile ("parabolic pulses") which, during their propagation in a medium with normal dispersion, widen without being deformed. A parabolic pulse laser comprises an amplifying fiber with normal dispersion and a dispersive delay line to compress the widened pulses in the amplifying fiber without introducing additional non-linearities. Such a laser is described, for example, in the article [Ilday 2004] and in the document U.S. Pat. No. 7,436,862. The energy at the output of the oscillator does not exceed a few nanojoules.

The fiber lasers "with totally normal dispersion" (ANDI, standing for "All-Normal Dispersion", or ANDF, standing for "All-Normal Dispersion Fiber") also comprise an amplifying fiber with normal dispersion, but do not provide any dispersion compensation element. The widening of the pulses is compensated by the fast saturable absorber responsible for the mode locking (which shortens the pulses by strongly attenuating their tails), possibly assisted by a spectral filtering (the pulses exhibit a strong frequency drift, which means that spectral filtering reduces their duration, unlike what happens for pulses limited by Fourier transformer). The principle of operation of such a laser oscillator is described, for example, in the document WO 2008/105833.

When conventional amplifying optical fibers are used, the laser oscillators with all-normal dispersion generate pulses whose energy does not exceed approximately 20 nJ (see for example [Chichkov 2010]). However, this value can be increased by using amplifying optical fibers with large modal surface, of the photonic crystal type. See for example the article [Ortac 2009], in which a photonic crystal fiber bar with an effective modal surface of 2800 μm² (to be compared to the few square micrometers of the conventional optical fibers) doped with ytterbium made it possible to obtain pulses exhibiting an energy of 927 nJ and a duration of 711 fs (after compensation of the linear frequency drift) at the wavelength of 1.04 μm. However, the fiber bar used in the oscillator described in this article is multi-mode and therefore requires the use of a spatial filter to select the fundamental mode, thus complicating the architecture of the oscillator.

A unimodal photonic crystal fiber bar with large effective area of 1320 μm² was able to be obtained by increasing the pitch of the two-dimensional periodic structure inscribed in the cladding. The use of this large pitch fiber in a mode-locking oscillator made it possible to obtain pulses exhibiting an energy of 534 nJ and a duration of 100 fs ([Baumgartl 2011]).

The use of photonic crystal fiber bars does nevertheless present certain drawbacks.

Firstly, these fibers are rectilinear and rigid: one of the major advantages of fiber-optic lasers is therefore lost: namely their compactness. They are also fragile and costly to manufacture.

Next, the sign of their dispersion is determined by the nature of the material, the dispersion due to the guiding being negligible. This means that a silica fiber cannot be used for oscillators emitting at wavelengths greater than 1.27 μm, which notably excludes the possibility of using a doping with erbium $Er^{3+}$ (emission around 1.55 μm) or with thulium $Tm^{3+}$ (emission around 2 μm). The use of other materials than silica (fluoride, chalcogenide, tellurium, and other such glasses) poses problems of integrability with the conventional fibers and the silica fiber components.

Furthermore, the allowable maximum energy depends linearly on the effective modal surface, which in practice cannot exceed a few thousand square micrometers. These types of lasers therefore offer little in the way of energy progression margins.

The invention aims to remedy, entirely or partly, the abovementioned drawbacks of the prior art. Notably, the invention aims to provide a fiber-optic laser that can generate ultra-brief pulses of higher energy than the fiber laser oscillators known from the prior art and/or that have a simpler and more compact structure, for example by being entirely integratable into an "all-fiber" system, and/or that are capable of a laser radiation at a wavelength that is inaccessible or difficult to access with the lasers with all-normal dispersion known from the prior art.

One subject of the invention is a laser oscillator comprising an amplifying optical fiber inserted into a resonant cavity to serve as active medium, and pumping means to provoke a population inversion in said amplifying optical fiber, characterized in that said amplifying optical fiber comprises at least two cores optically coupled to one another in a common cladding and in that the shapes, the dimensions, the refractive indices and the relative arrangement of said cores are chosen in such a way as to support super modes, of which at least one exhibits, in an emission spectral band of said laser oscillator, a normal chromatic dispersion.

The use of two (or more) cores optically coupled to one another is doubly advantageous. On the one hand, it makes it possible to increase the effective modal surface compared to a conventional optical fiber comprising a single cylindrical core at the center of the fiber. On the other hand, it is possible to choose the physical and geometrical parameters of such a fiber so as to obtain a normal chromatic dispersion with a very high value, which makes it possible to greatly stretch the pulses and consequently increase their maximum energy. Moreover, this chromatic dispersion is practically independent of the dispersion of the material, which eliminates the abovementioned constraints on the emission wavelength which effect the lasers with all-normal dispersion and with large effective modal surface.

According to different embodiments of a laser oscillator that conforms to the invention:

the shapes, the dimensions, the refractive indices and the relative arrangement of the cores of said amplifying optical fiber can be chosen such that said super-mode exhibits, in said emission spectral band, a normal chromatic dispersion, less than or equal to −100 ps/nm/km and preferably less than or equal to −700 ps/nm/km.

the shapes, the dimensions, the refractive indices and the relative arrangement of the cores of said amplifying optical fiber can be chosen such that said super-mode exhibits, in said emission spectral band, an effective modal surface greater than or equal to $50\lambda^2$, $\lambda$, being the central wavelength of said emission spectral band, said amplifying optical fiber can have a doping with a spatial distribution chosen so as to ensure a preferential amplification of said super-mode exhibiting, in said emission spectral band of the laser oscillator, a normal chromatic dispersion, said amplifying fiber can exhibit a normal chromatic dispersion band with a width, at 0.8 times the maximum value, greater than or equal to 1 nm, and preferably greater than or equal to 10 nm.

said amplifying optical fiber may comprise a central core, notably cylindrical, and at least one annular peripheral core, surrounding said central core, and notably coaxial therewith. In particular, said central core may be monomode in said emission spectral band.

as a variant, said amplifying optical fiber may be a bandgap fiber.

said amplifying fiber may be made of silica, said amplifying optical fiber may be doped so as to exhibit an optical gain in a spectral region in which the chromatic dispersion of the material of which it is made is abnormal. In particular, it may be made of silica, doped with erbium or thulium ions.

the oscillator may also comprise a fast saturable absorber to induce operation in mode-locking regime:

the resonant cavity may exhibit an all-normal dispersion in said emission spectral band, said resonant cavity may be in the form of a ring and contain an optical isolator to allow it unidirectional operation.

said resonant cavity in the form of a ring may be entirely produced in optical fiber.

Figure 2A:
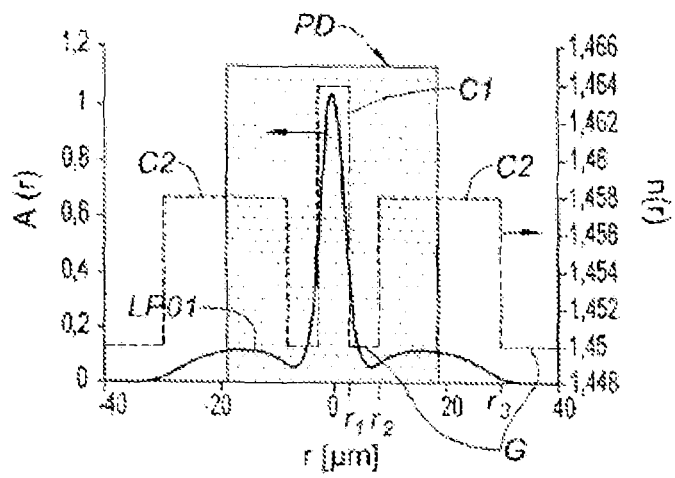
Figure 2B:
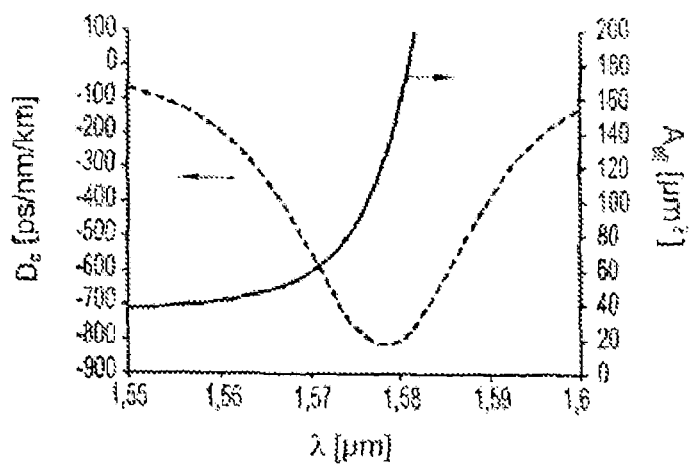
Figure 3A:
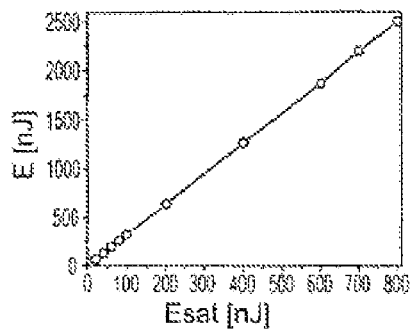
Figure 3B:
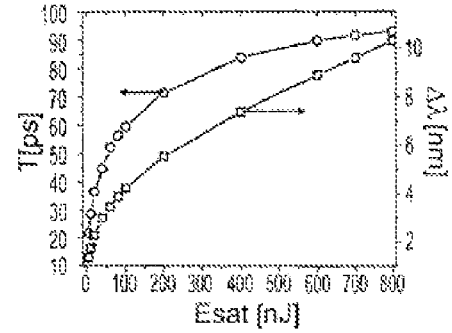
Figure 5A:
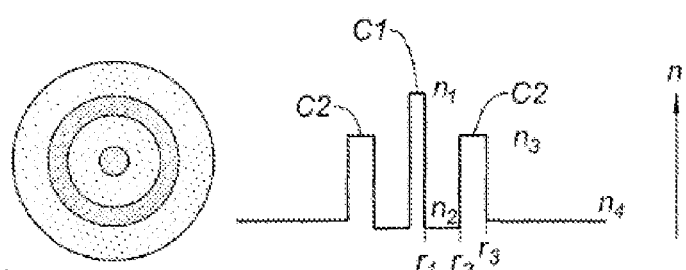
Figure 5B:
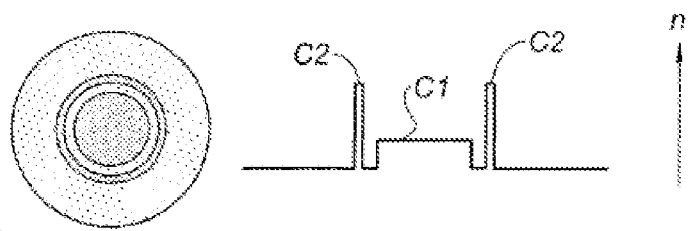
Figure 6:
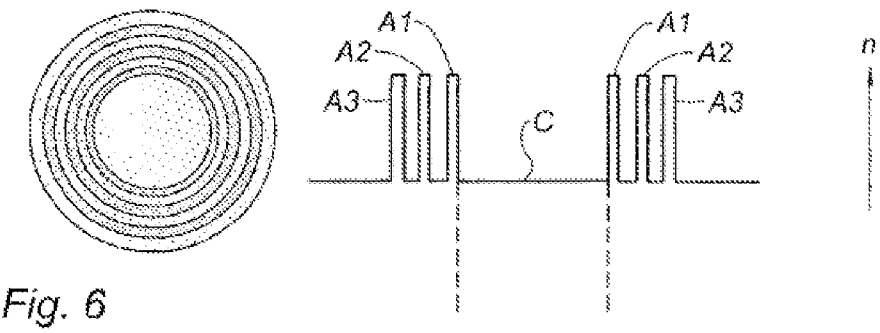
Figure 7A:
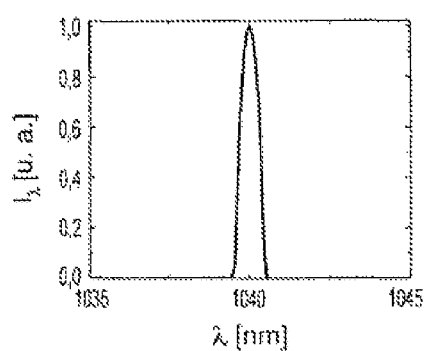
Figure 7B:
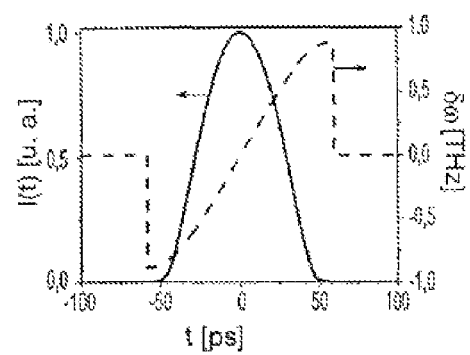
Figure 8A:
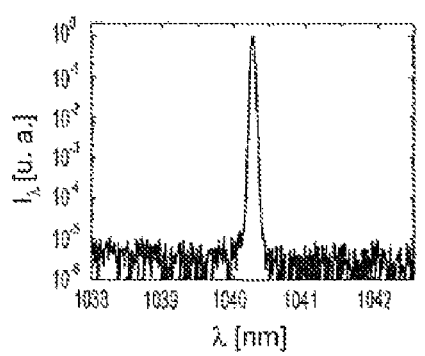
Figure 8B:
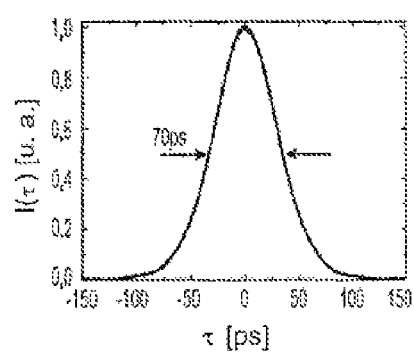

Other features, details and advantages of the invention will emerge on reading the description given with reference to the appended drawings given as examples and which represent, respectively:

FIG. 1, the block diagram of a laser oscillator according to one embodiment of the invention;

FIGS. 2A and 2B, the structure and the characteristics of an amplifying optical fiber according to one embodiment of the invention;

FIGS. 3A and 3B, the trend, as a function of pumping power, of energy, of duration and of spectral width, of the pulses generated by a laser having the structure illustrated in FIG. 1 and using, as active medium, an amplifying optical fiber according to FIGS. 2A and 2B;

FIGS. 4A, 4B, 4C and 4D show, respectively, the temporal and spectral profiles of the pulses emitted by said laser for an energy of 2.5 µJ, the temporal profile obtained after compensation of the frequency drift, and the dynamic range of these pulses inside the cavity of the laser oscillator;

FIGS. 5A and 5B, the refractive index profiles of two amplifying fibers according to two other embodiments of the invention;

FIG. 6, the refractive index profile of an amplifying optical fiber according to yet another embodiment of the invention;

FIGS. 7A and 7B, respectively, the computed temporal and spectral profiles of the pulses emitted by a laser having the structure illustrated in FIG. 1 and using, as active medium, an amplifying optical fiber according to FIG. 6 for an energy of 30 nJ;

FIGS. 8A and 8B, respectively, the measured self-correlation and spectral profiles of the pulses emitted by said laser for an energy of 30 nJ.

FIG. 1 shows the block diagram of a laser oscillator with ring-form resonant cavity CRA according to one embodiment of the invention. Such a laser comprises:

an active medium MA, consisting of an amplifying optical fiber; the coupler CP is used to inject a pumping light generated by a laser diode DL;

an output coupler CS, making it possible to extract a fraction of the laser radiation generated by the oscillator;

a fast saturable absorber AS, allowing the laser oscillator to operate in mode-locking regime; and a non-reciprocal element, or optical isolator, ENR, allowing the propagation of the light in a single direction (clockwise, as indicated by the arrows).

External to the oscillator proper, a dispersive system SDC, exhibiting an abnormal dispersion, compresses the pulses extracted by the output coupler CS, ideally up to their Fourier limit.

The pumping system (coupler CP, source DL), the output coupler CS, the fast saturable absorber AS and the non-reciprocal element ENR can be conventional and will not be described in detail. In a fully integrated solution, they may be fiber-optic devices, linked together and to the amplifying medium by an optical fiber with normal dispersion. The pulse compression dispersion system SDC may also be conventional, for example produced by means of diffraction gratings and/or prisms and/or mirrors with frequency drift ("chirped mirrors"). In fact, what differentiates the oscillator of FIG. 1 from a fiber-optic laser source of the type with all-normal dispersion, such as that described, for example in the abovementioned document WO 2008/105833, is mainly the structure of the amplifying optical fiber MA. As stated above, such a fiber comprises at least two cores in a common cladding. Each core, considered individually, exhibits at least one propagation mode. However, the proximity of the cores induces a coupling between their respective modes, causing "super modes". The shape of the cores, their refractive indices and their relative arrangement constitute degrees of freedom making it possible to optimize (in this case, maximize) the effective modal surface, the chromatic dispersion of these super modes at the laser emission wavelength and the bandwidth in which the dispersion is strongly normal.

In particular, the amplifying optical fiber MA may comprise two concentric cores: a cylindrical central core, similar to that of a conventional optical fiber, and an annular peripheral core, coaxial to said central core. Optical fibers of this type are known in themselves, but have never been proposed as active medium for a laser.

For example, the articles [Thyagarajan 1996], [August 2000], [Février 2002] and [Gérôme 2006] describe the dispersion properties of passive optical fibers (non-amplifying) that have dual concentric cores, and their use as dispersion compensation modules. The document [Nielsen 2011] describes a passive fiber with concentric cores with a multi-mode central core and an annular core. The super-mode called "LP02", obtained by coupling of the second mode of the central core with a mode of the annular core, exhibits both a strong mode dispersion and a large effective mode area. The drawback of this technique is that it entails the use of two long-pitch gratings to convert the fundamental mode of a standard fiber to the LP02 super-mode. Because of this, a high-energy use of the fiber is excluded because of the significant non-linearities which would be induced in these gratings.

The documents EP 0 910 141 and WO 01/50639 describe amplifying optical fibers that have two concentric cores. The refractive index profile of these fibers is exploited to control the spectral dependency of the gain; when it comes to fibers intended for signal transmission, they are not designed so as to exhibit a significant dispersion, or a large effective mode area. The document WO 01/50639 also addresses the issue of using such a fiber in a Raman laser; however, the principle of operation of such a laser is totally different from that of a "conventional" laser, using a fluorescent emission, as in the case of the present invention. Furthermore, the fiber with concentric cores is again used for its spectral filtering properties and not its dispersion properties.

The article [Maury 2004] describes an amplifying optical fiber that has two concentric cores, a normal chromatic dispersion of high value and an effective mode area of 17 $\mu m^2$ at 1.55 $\mu m$, or $7\lambda^2$. This fiber is intended to be used to compensate the chromatic dispersion in the optical communication systems.

In FIG. 2A, the dotted-line curve shows the refractive index profile n(r) of a fiber MA suitable for the implementation of the invention, made of silica and made to amplify by a doping with erbium ions ($Er^{3+}$), in order to obtain a laser emission at the abovementioned wavelength of 1.58 $\mu m$.

This fiber has an internal core C1 with a radius $r_1$ of 3 $\mu m$ and refractive index $n_1=1.464$; an annular core C2 with an internal radius $r_2=7$ $\mu m$ and an external radius $r_3=30$ $\mu m$, of refractive index $n_2=1.458$; and a cladding G of refractive index $n_3=1.45$ between the two cores and outside the annular core. Conventionally, the index profile n(r) is obtained by doping with germanium dioxide. The continuous line shows the amplitude profile A(r) of the fundamental super-mode, hereinbelow given as "SM1", obtained by coupling between the single mode of the central core and the lowest even order (zero order) mode of the annular core, at the wavelength of 1.58 $\mu m$. This super-mode is mainly concentrated in the central core, but it also exhibits "wings" which extend into the annular core. The coupling of these same fundamental modes also gives another super-mode, hereinafter called "SM2", not represented here and more concentrated in the annular core. The doping profile, illustrated by the shaded region PD, is designed so as to exhibit a better overlap with the super-mode SM1 than with the super-mode SM2; thus, the first will be amplified preferentially. For the wavelength of interest (1.58 $\mu m$), the overlap factor of the super-mode SM1 is maximized, and has a value of approximately 0.75 for a rectangular doping in the region $0<r<(r_2+r_3)/2$. In these conditions, the overlap factor of the super-mode SM2 is approximately 0.25; the super-mode SM1 is therefore widely favored.

FIG. 2B shows how the chromatic dispersion $D_c$ (dotted line, left-hand scale) and the effective mode area $A_{eff}$ (continuous line, right-hand scale) for the super-mode SM1 depend on the wavelength $\lambda$. At the laser wavelength ($\lambda_{las}=1.58$ $\mu m$) the dispersion is negative and takes the value of −800 ps/nm/km; it remains below −640 ps/nm/km over a spectral band for which the width $\Delta\lambda$, is approximately 13 nm. As for the effective mode area, it takes at the laser wavelength the value of 150 $\mu m^2$, or approximately $60\lambda_{las}^2$. For $\lambda>1.59$ $\mu m$ approximately, the super-mode SM1 is located mainly in the annular core and the overlap factor with the doped region decreases strongly; it is therefore not possible to work in this spectral region.

FIGS. 3A and 3B show how different properties (energy E, duration $\Delta t$, spectral width $\Delta\lambda$) of the laser pulses, generated by the oscillator of FIG. 1 using as active medium the fiber MA of FIG. 2, depend on the saturation energy of the material, $E_{sat}$, considered to be representative of the pumping power. These figures show that it is possible to obtain pulses with an energy of several $\mu J$, with a duration of 20-95 ps. These pulses are greatly stretched, because this duration must be compared with the duration limited by Fourier transform which, for a spectral width of approximately 10 nm, is 366 fs at 1.58 $\mu m$, assuming a Gaussian temporal profile.

Figure 4A:
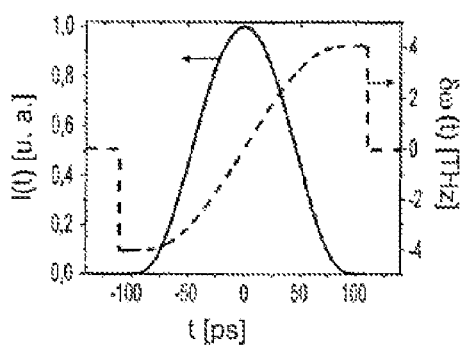

FIG. 4A shows the temporal profile of intensity I(t) (continuous line curve, left-hand scale, in arbitrary units—"u.a.") and of instantaneous frequency $\delta\omega(t)$ (broken line curve, right-hand scale in THz) of a pulse of energy equal to 2.5 $\mu J$. The duration T of this pulse (defined as its full width at mid-height) is approximately 93 ps. Its stretch can be largely explained by a linear frequency ramp. This stretching is an inevitable consequence of the strong chromatic dispersion introduced by the amplifying fiber and of the absence of any compensation element with abnormal dispersion. In fact, this stretching is the key to the increasing of the energy for each pulse; if necessary it can be compensated out of cavity by a conventional compression system. Moreover, the fact of having, at the output of the oscillator, pulses that are already stretched, is advantageous if an out-of-cavity amplification is necessary.

Figure 4B:
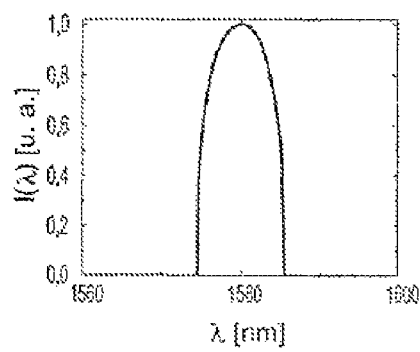

FIG. 4B shows the spectrum of the pulse of FIG. 4A. It can be seen that this spectrum is highly regular and symmetrical, without modulations and/or asymmetries induced by non-linear effects. Moreover, it exhibits a substantially parabolic appearance, which reflects a similaritonic propagation.

Figure 4C:
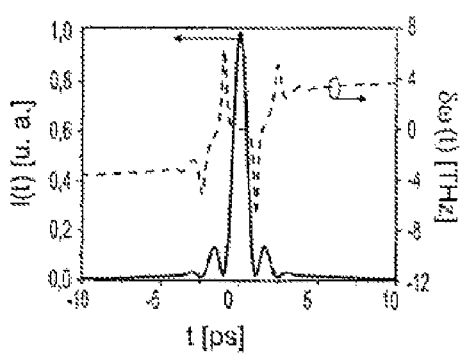

FIG. 4C shows the temporal profile of intensity I(t) obtained after compensation of the frequency drift of the pulses of FIG. 4A. The duration of the pulse is then shortened to 950 fs. It is 1.33 times the duration obtained by performing the Fourier transform of the spectrum of FIG. 4C assuming a zero phase, which shows that the frequency drift is mostly linear.

Figure 4D:
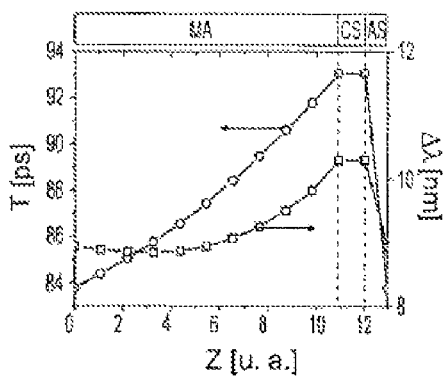

FIG. 4D illustrates the trend of the spectral width (right-hand scale) and of the duration (left-hand scale) of the pulse as a function of the position z in the cavity. It can be seen that, in accordance with the principle of laser oscillators with all-normal dispersion, the duration of the pulse increases monotonically inside the amplifying fiber (MA), is stabilized in the output coupler (CS) and is substantially reduced by the fast saturable absorber (AS).

The table below can be used to compare the laser oscillator according to the embodiment of the invention which has just been described with two embodiments of the prior art, described in the abovementioned references [Baumgartl 2011] and [Chichkov 2010]. For each laser, there are indicated the emission wavelength $\lambda_0$ (in $\mu m$), the rare earth ion used as dopant to introduce an optical gain, the effective mode area $A_{eff}$ (in $\mu m^2$), the dispersion $D_c$ (in ps/nm/km), the maximum bandwidth of the pulses $\Delta\lambda$ (in nm), and the energy E of the pulses obtained (in $\mu J$). Moreover, each laser is characterized by a "figure of merit" FOM, measured in $\mu J$, defined by FOM=$6\pi c \ [D_c]^2 \cdot \Delta\lambda^3/(\lambda_0^2 \cdot \gamma \cdot g)$, where c is the speed of light in a vacuum, g the low signal gain assumed fixed and equal to 1.6 $m^{-1}$ for all the configurations and $$\gamma = \frac{n_2 \varpi_0}{c A_{\it eff}}.$$

The spectral width of the pulses is limited either by the width of the gain band $\Delta\lambda_g$ or by the width of the dispersion band $\Delta\lambda_d$ defined at 0.8 $D_{cmax}$ ($D_{cmax}$ being the maximum value, as an absolute value, of the chromatic dispersion parameter Dc): $\Delta\lambda = \min(\Delta\lambda_g, \Delta\lambda_d)$. The dispersion band width $\Delta\lambda_d$ is defined at $0.8 D_{cmax}$ in order to be freed of the effects of the higher order dispersion, in particular the $3^{rd}$ order dispersion ($\beta_3 = \delta\beta_2/\delta\omega$). The figure of merit is proportional to the maximum energy of the output pulses in the case of an amplification in parabolic regime (see the article [Deng 2009]): in fact, this energy is all the higher as the dispersion increases, the spectral band widens and the effective mode area increases.

| Oscillator | $\lambda_0$ | Ion | $A_{\it eff}$ | $D_c$ | $\Delta\lambda$ | Energy | FOM |
|---|---|---|---|---|---|---|---|
| [Baumgartl 2011] | 1.04 | $Yb^{3+}$ | 1320 | −30 | 40 | 0.5 | 1.34 |
| [Chichkov 2010] | 1.55 | $Er^{3+}$ | 12.6 | −28 | 30 | 0.02 | $2 \cdot 10^{-3}$ |
| Invention | 1.04 | $Yb^{3+}$ | 100 | −180 | 26 | 0.8 | 0.97 |
| Invention | 1.58 | $Er^{3+}$ | 120 | −640 | 13 | 2.5 | 1.28 |
| Invention | 2 | $Tm^{3+}$ | 140 | −210 | 40 | 2.6 | 3.2 |

The energy extracted from the oscillator according to the invention is five times that obtained according to [Baumgartl 2011], despite a substantially smaller effective mode area and a slightly lower figure of merit. In practice, the mode area difference is more than compensated by the much higher value of the dispersion which, in [Baumgartl 2011], is dictated by the properties of the material. It will also be noted that, precisely for this reason, the laser of [Baumgartl 2011] cannot use an $Er^{3+}$ doping to emit around 1.55 μm, or a $Tm^{3+}$ doping to emit around 2 μm. That of [Chichkov 2010] emits at 1.55 μm, but the energy that it makes possible to achieve is less than that obtained by virtue of the invention by two orders of magnitude.

The invention is not limited to the use of amplifying optical fibers exhibiting a refractive index profile of the type illustrated in FIG. 2A. FIGS. 5A and 5B illustrate two other examples of refractive index profiles which are suited to the implementation of the invention. In the case of FIG. 5A, the outer part of the cladding ($r>r_3$) exhibits a different refractive index (lower; $n_4<n_2$) than the inner part ($r_1<r<r_2$); in the case of FIG. 5B, the central core is wider and weakly guiding ($n_1<n_3$) in order to maximize the effective mode area while allowing for unimodal operation. These profiles, like that of FIG. 2A, are of the so-called "W" type. However, more different structures can be used, such as "solid" fibers (entirely of glass, unlike the photonic crystal fibers consisting of glass and air) with photonic band gap, the refractive index profile of which is illustrated schematically in FIG. 6. In such a fiber, the refractive index of the core C can be the same as that of the cladding or slightly higher, the guiding being ensured only or primarily by the band gap created by the pairs of concentric rings A1, A2, A3, A4, A5 of alternately high and low refractive index. For the implementation of the invention, the innermost ring (A1) can act as second core; the super-mode exploited is obtained by the coupling of the lowest order mode of the central core and an odd mode of the ring A1. The invention has been tested experimentally by using an ytterbium-doped fiber exhibiting the same refractive index profile as the passive fiber described in detail in the article [Gérôme 2007]. The dispersion is very high (Dc=1500 ps/nm/km at the wavelength $\lambda_0$=1.04 μm), but the performance levels are limited by a relatively narrow useful spectral band, $\Delta\lambda_d$=1 nm, which leads to a figure of merit FOM=$10^{-2}$ and to pulses with an energy that is at most a few tens of nanojoules. It has to be said that the fiber was not optimized for this specific application; in fact, it is remarkable that a stable operation in mode-locking regime is obtained with such a narrow useful spectral band.

FIGS. 7A and 7B show the calculated temporal and spectral profiles of the pulses for an output energy of 30 nJ. The calculated pulses exhibit a narrow spectrum of 0.69 nm wide at mid-height for a temporal width of 56 ps. The pulses exhibit a strong linear frequency drift.

FIGS. 8A and 8B show the spectrum and the trace of self-correlation ($I_{AC}$, function of the delay τ) measured at the output of the oscillator, also for pulses with an energy of 30 nJ. The width at mid-height of the self-correlation trace is 70 ps, which corresponds to pulses of 50 ps duration assuming a Gaussian profile. These experimental results are in very close agreement with the numerical predictions of FIGS. 7A and 7B.

The object of the invention is not limited to the embodiments described above. Different optical fiber structures can be used, provided that they comprise at least two cores optically coupled to one another in a common cladding; these fibers can be produced in different materials and have dopings other than by erbium and ytterbium ions. These fibers can be integrated in oscillators that do not necessarily have the architecture of FIG. 1 (in particular, the cavity does not necessarily have to be in the form of a ring). Any mode-locking technique (fast absorber, slow absorber, active locking by a modulator, etc.) can be used, and, moreover, a laser operator according to the invention does not necessarily have to operate in mode-locking regime, although the generation of ultra-brief pulses is the application primarily targeted.

REFERENCES

[Ilday 2004]: F. Ö. May et al. <<Self-Similar Evolution of Parabolic Pulses in a Laser>>, Phys. Rev. Lett. 92. 213902 (2004).

[Ortac; 2009]: B. Ortac et al. <<Approaching microjoule pulse energy with mode-Socked femtosecond fiber laser>>, Optics Letters 34, No. 10, pages 1585-1587 (2009).

[Baumgartl 2011] M. Baumgartt et al. <<High average and peak power femtosecond target-pitch photonic-crystal-fiber laser>>, Optics Letters 38. No. 2, pages 244-246 (2011)

[Thyagarajan 1996]: K. Thyagarajan et al. <<A Novel Design of a Dispersion Compensating Fiber>>, IEEE Photonics Technology Letters Vol. 8, No. 11, novembre 1396, pages 1510-1512.

[Auguste 2000]. J-L Auguste et al. <<−1800 ps/(nm·km) chromatic dispersion at 1.55 μm in dual concentric core fibre>>, Electronics Letters, Vol. 38, No. 2, 28 Sep. 2300, pages 1889-1691.

[Février 2002]: S. Février et al <<Accurate tuning of the highly-negative-chromatic-dispersion wavelength into a dual concentric core fibre by macro-bending>>, Proceedings of the ECOC 2002, Copenhagen, Danemark,

[Gérôme 2006]: F. Gérôme et al. <<Theoretical and Experimental Analysis of 8 Chromatic Dispersion Compensating Module Using a Dual Concentric Core Fiber>>. Journal of Lightwave Technology Vol. 24. No. 1, janvier 2008, page 442-448.

[Nielsen 2011] L. Grüner-Nielsen et al. <<A Dispersion Compensating Fiber with a Factor 5 Improvement in Figure of Merit and a Factor 4.5 improvement in Effective Area>>, OFC-NFOEC'2011, Los Angeles, Mar. 6-10, 2011, Paper OWA1.

[Deng 2009] Y, Deng et al., <<Generation of sub-50 fs pulses from a high-power Yb-doped fiber amplifier>>, Optics Letters Vol. 34. No. 22. 3489-3471 (2009)

[Géróme 2007]: F. Géróme et al. <<Highly dispersive large mode area photonic bandgap fiber>>. Optics Letters Vol. 32, No. 10, 15 mal 2007, page 1208-1210.

[Chichkov 2010] A. Chichkov et al, < High-power dissipative solitions from an abnormal dispersion erbium fiber oscillator>>, Optics Letters 35, No. 18, pages 2807-2809 (2010).

[Maury 2004] J. Maury et al. <<Conception and characterisation of a dual-concentric-core erbium-doped dispersion-compensating fiber>>. Optics Letters, Vol. 29. No. 7, pages 700-702 (2004).

[Lenz 1995] G. Lenz et al. <<All-solid-state femtosecond source at 1.55 μm>>. Optics Letters, Vol. 20. No. 11, pages 1289-1291 (1805).

The invention claimed is:

1. A laser oscillator, comprising:
an amplifying optical fiber inserted into a resonant cavity to serve as active medium, and
a pumping system to provoke a population inversion in said amplifying optical fiber,
wherein said amplifying optical fiber comprises at least two cores optically coupled to one another in a common cladding, and
wherein the shapes, the dimensions, the refractive indices, and the relative arrangement of said cores support super modes,
wherein at least one of the super modes exhibits, in an emission spectral band of said laser oscillator, a normal chromatic dispersion substantially independent of the dispersion of the material of which the optical fiber is made.

2. The laser oscillator as claimed in claim 1, in which the shapes, the dimensions, the refractive indices, and the relative arrangement of the cores of said amplifying optical fiber are chosen such that said super mode exhibits, in said emission spectral band, a normal chromatic dispersion, less than or equal to −100 ps/nm/km.

3. The laser oscillator as claimed in claim 1, in which the shapes, the dimensions, the refractive indices and the relative arrangement of the cores of said amplifying optical fiber are chosen such that said super mode exhibits, in said emission spectral band, an effective modal surface greater than or equal to $50\lambda^2$, $\lambda$ being the central wavelength of said emission spectral band.

4. The laser oscillator as claimed in claim 1, in which said amplifying optical fiber has a doping with a spatial distribution chosen so as to ensure a preferential amplification of said super mode exhibiting, in said emission spectral band of the laser oscillator, a normal chromatic dispersion.

5. The laser oscillator as claimed in claim 1, in which said amplifying fiber exhibits a normal chromatic dispersion band with a width, at 0.8 times the maximum value, of greater than or equal to 1 nm.

6. The laser oscillator as claimed in claim 1, in which said amplifying optical fiber comprises a central core (C1) and at least one annular peripheral core (C2), surrounding said central core.

7. The laser oscillator as claimed in claim 6, in which said central core is unimodal in said emission spectral band.

8. The laser oscillator as claimed in claim 1, in which said amplifying optical fiber is a bandgap fiber.

9. The laser oscillator as claimed in claim 1, in which said amplifying optical fiber is made of silica.

10. The laser oscillator as claimed in claim 1, in which said amplifying optical fiber is doped so as to exhibit an optical gain in a spectral region in which the dispersion of the material of which it is made is abnormal.

11. The laser oscillator as claimed in claim 1, in which said amplifying optical fiber is made of silica, doped with erbium or thulium ions.

12. The laser oscillator as claimed in claim 1, also comprising a fast saturable absorber (AS) to induce operation in mode-locking regime.

13. The laser oscillator as claimed in claim 12, in which the resonant cavity exhibits an all-normal dispersion in said emission spectral band.

14. The laser oscillator as claimed in claim 1, in which said resonant cavity is in the form of a ring and contains an optical isolator (ENR) to allow it unidirectional operation.

15. The laser oscillator as claimed in claim 14, in which said resonant cavity in the form of a ring is entirely produced in optical fiber.

16. The laser oscillator as claimed in claim 1, in which the shapes, the dimensions, the refractive indices, and the relative arrangement of the cores of said amplifying optical fiber are chosen such that said super mode exhibits, in said emission spectral band, a normal chromatic dispersion less than or equal to −700 ps/nm/km.

17. The laser oscillator as claimed in claim 1, in which said amplifying fiber exhibits a normal chromatic dispersion band with a width, at 0.8 times the maximum value, of greater than or equal to 10 nm.

* * * * *